Figure 1:
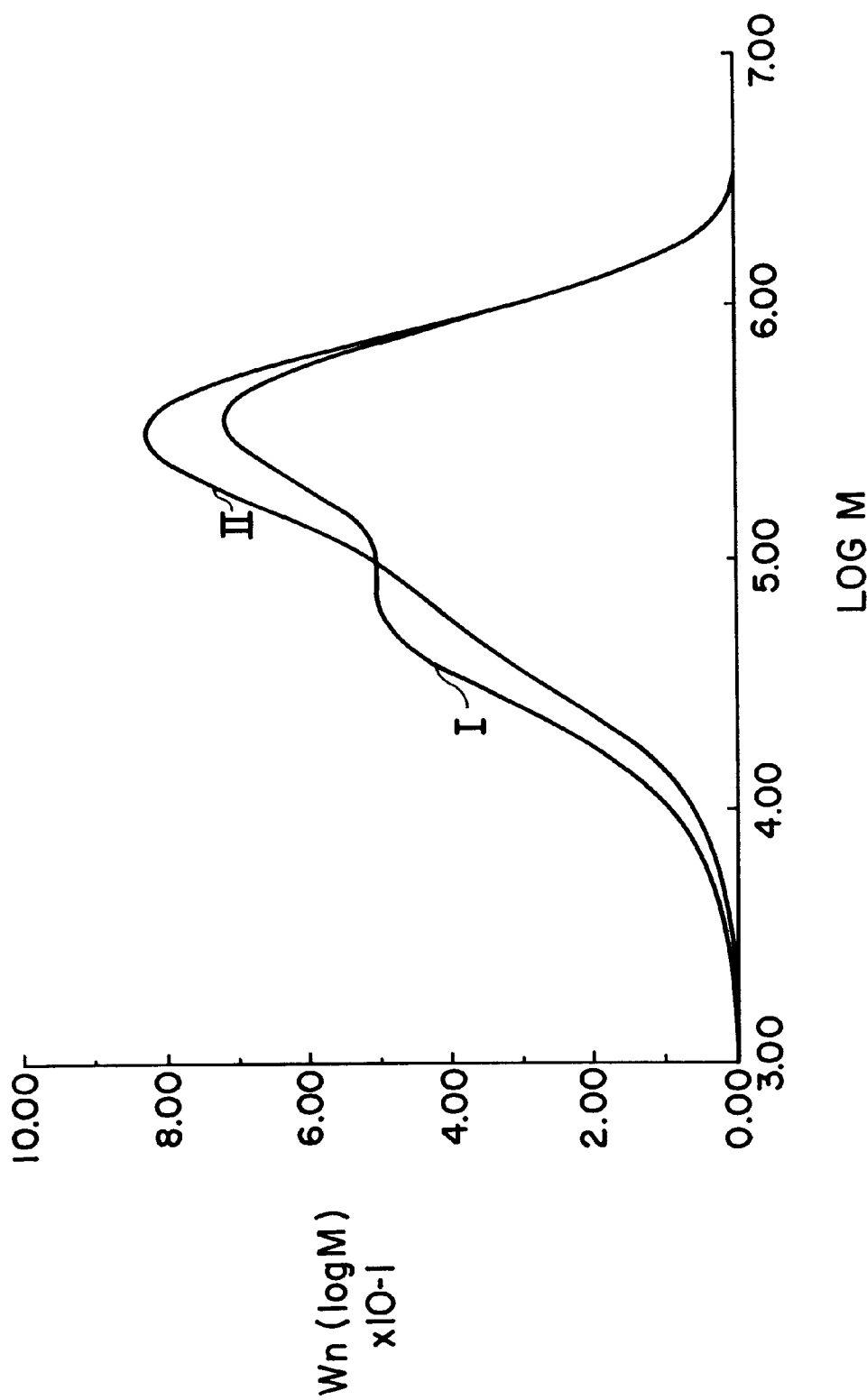

United States Patent [19]
Muskens et al.

[11] Patent Number: 5,902,867
[45] Date of Patent: *May 11, 1999

[54] PROCESS FOR THE PREPARATION OF AN ELASTOMERIC POLYMER FROM ETHYLENE, ALPHA-OLEFINE AND OPTIONALLY DIENE

[75] Inventors: Bernardus J. Muskens, Geleen; Jacob Renkema, Born, both of Netherlands

[73] Assignee: DSM NV, Heerlen, Netherlands

[ * ] Notice: This patent is subject to a terminal disclaimer.

[21] Appl. No.: 08/732,278

[22] PCT Filed: Apr. 18, 1995

[86] PCT No.: PCT/NL95/00140

§ 371 Date: Dec. 26, 1996

§ 102(e) Date: Dec. 26, 1996

[87] PCT Pub. No.: WO95/30698

PCT Pub. Date: Nov. 16, 1995

[30] Foreign Application Priority Data

May 6, 1994 [NL] Netherlands .............................. 9400758

[51] Int. Cl.$^6$ .......................... C08F 4/642; C08F 210/18
[52] U.S. Cl. .......................... 526/170; 526/127; 526/126; 526/160; 526/282
[58] Field of Search ..................................... 526/127, 160, 526/282, 348, 170, 126

[56] References Cited

U.S. PATENT DOCUMENTS

| | | | |
|---|---|---|---|
| 5,001,205 | 3/1991 | Hoel | 526/160 |
| 5,350,817 | 9/1994 | Winter et al. | 526/160 |
| 5,372,980 | 12/1994 | Davis | 526/160 |
| 5,455,365 | 10/1995 | Winter et al. | 526/126 |
| 5,543,373 | 8/1996 | Winter et al. | 526/160 |
| 5,576,260 | 11/1996 | Winter et al. | 526/160 |

*Primary Examiner*—Edward J. Smith
*Attorney, Agent, or Firm*—Pillsbury Madison & Sutro LLP Cushman Darby & Cushman Intellectual Property Group

[57] ABSTRACT

The invention relates to a process for the preparation of a polymer from ethylene, an α-olefine and optionally a diene, according to which these monomers are polymerized under the influence of a metallocene catalyst, the polymerization taking place in the presence of a catalyst comprising a specific 2-indenyl metallocene, resulting in a bimodal, elastomeric polymer with a molecular weight distribution of more than 3.5, under such reaction conditions that the amount of water in the polymerization medium is smaller than 0.5 ppm.

The invention also relates to polymers with a specific branching index.

19 Claims, 3 Drawing Sheets

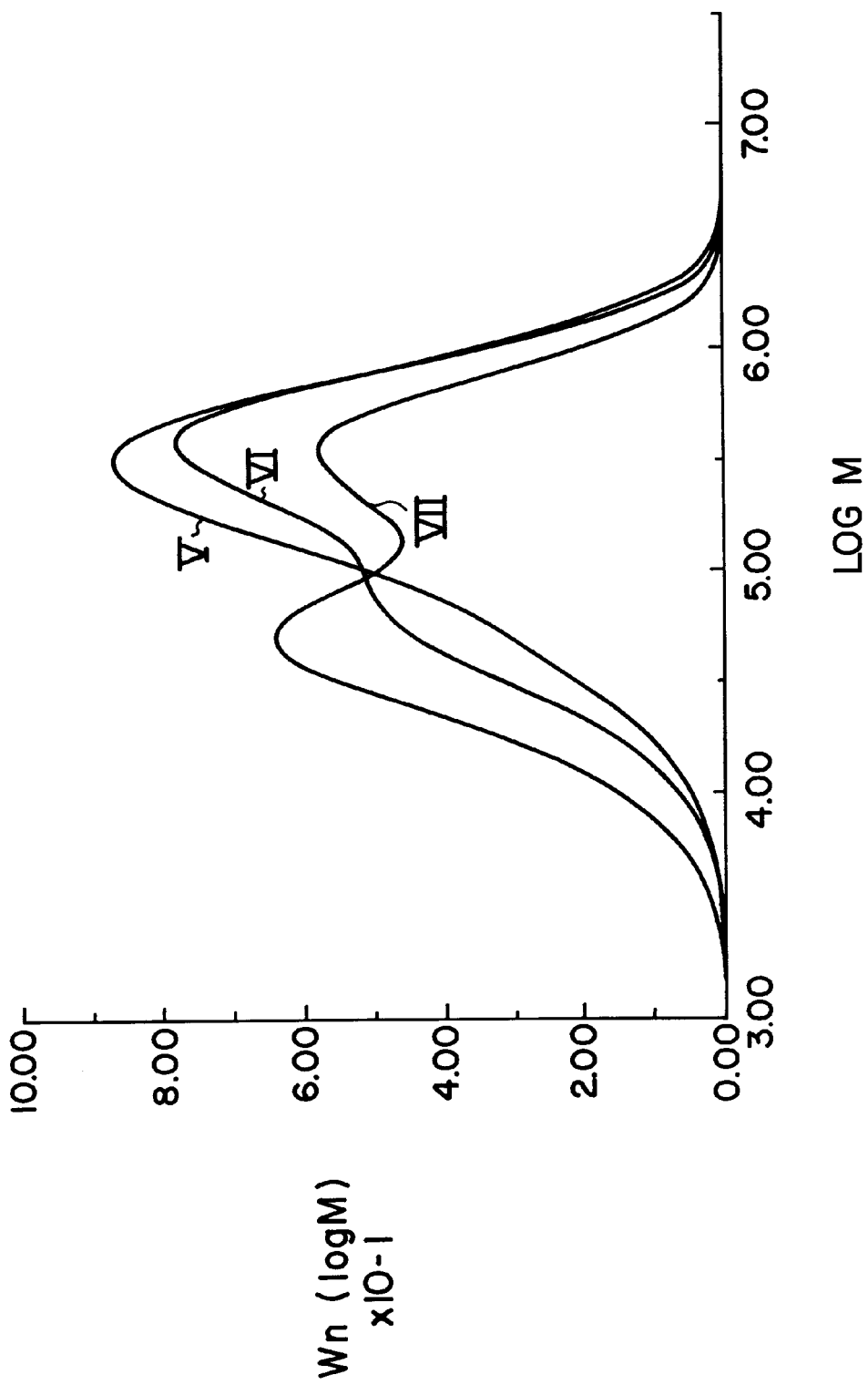

PROCESS FOR THE PREPARATION OF AN ELASTOMERIC POLYMER FROM ETHYLENE, ALPHA-OLEFINE AND OPTIONALLY DIENE

The invention relates to a process for the preparation of an elastomeric polymer from ethylene, an α-olefine and optionally a diene (EA(D)M), according to which these monomers are polymerised under the influence of a metallocene catalyst. More particular this invention relates to the preparation of such a polymer with a high molecular weight. For the scope of this invention 'a polymer with a high molecular weight' is understood to be a polymer with a weight average molecular weight $M_w$, determined in the manner described hereafter, of at least 50,000 kg/kmol.

Such a process is known from EP-A-347,129. In that patent publication use is made of a catalyst that is a bridged bis-radical metallocene catalyst. EADM terpolymers are prepared that have a $M_w$ of at least 110,000 kg/kmol. The terpolymers that are prepared according to EP-A-347,129 have a narrow molecular weight distribution (MWD), as can be inferred from the fact that in the examples the ratio of the weight average molecular weight and the number average molecular weight ($M_n$; MWD=$M_w/M_n$)) is 3.5 or smaller and in particular smaller than 3. In general, polymers with such a narrow molecular weight distribution are obtained when use is made of metallocene catalysts.

The consequence of the narrow molecular weight distribution is that the polymers have good mechanical properties, including a good compression set. The compression set is determined according to ISO 815. A drawback of the narrow molecular weight distribution, however, is that the processability of the polymers is poorer than that of polymers having a wider molecular weight distribution.

The aim of the invention is to provide a process for the preparation of elastomeric polymers with improved processability and unimpaired good mechanical properties.

This aim is achieved according to the invention because in the polymerisation a bimodal elastomeric polymer with a molecular weight distribution (MWD) of more than 3.5 is prepared, using as the metallocene catalyst a 2-indenyl metallocene having the general formula:

$$\text{R'Ind—M—(Cp)—Q}_k \quad (1)$$

where the symbols have the following meanings:
M a metal chosen from the group comprising zirconium and titanium
Ind an indenyl group
R' an alkyl, aralkyl, aryl group or a group with at least one hetero atom from groups 14, 15 or 16 of the Periodic System of the Elements, bound to the Ind-group at the 2-position
Cp a cyclopentadienyl group, whether or not substituted
Q a ligand to M,
and where the polymerisation is carried out under such reaction conditions that the amount of water in the polymerisation medium is smaller than 0.5 ppm. According to the invention, elastomeric polymers with improved processability and good mechanical properties are obtained through polymerisation in one reactor with a high catalyst yield.

Figure 2:
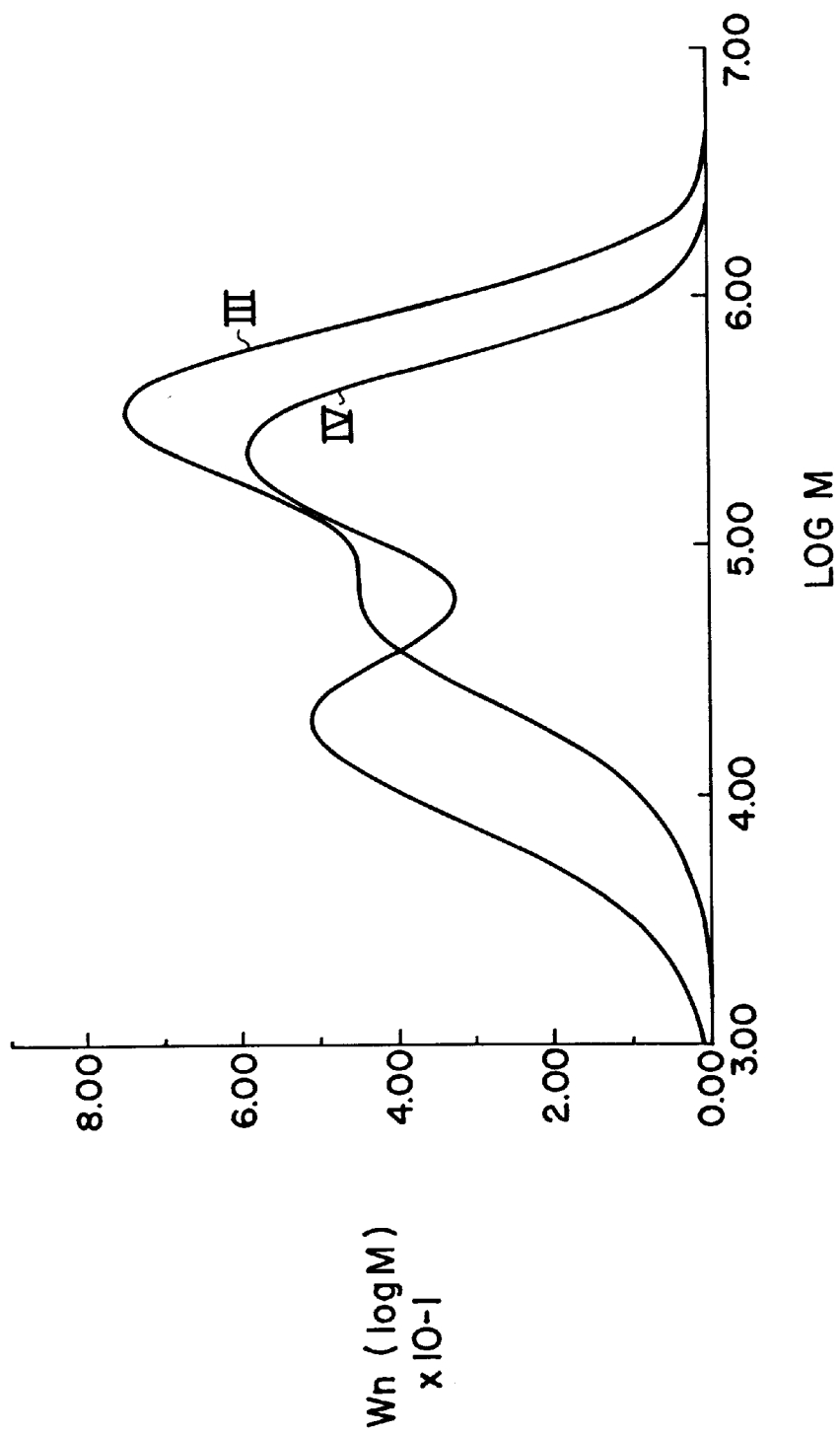

FIGS. 1, 2 and 3 are SEC chromatograms of the polymers prepared in the Examples.

It has been found that a 2-indenyl metallocene is necessary for obtaining elastomeric polymers with a wide molecular weight distribution, but that the use of this catalyst component does not result in an elastomeric polymer with a wide molecular weight distribution under all reaction conditions. A very important factor is the absence of water in the polymerisation medium. It has been found that a good catalyst activity is observed in the presence of at least 0.5 ppm water, but that a wide molecular weight distribution as well as the bimodality of the polymer are not obtained. The monomers have to be purified more than usual. The polymerisation temperature, the polymerisation time (and, where present, the diene concentration) also affect the width of the molecular weight distribution and the type of bimodality. The above will be explained with reference to examples below.

In the 2-indenyl from formula (1) k is a whole number, coupled to the valency of M in the following manner: k equals the valency of M minus 2, divided by the valency of the Q group. The Ind group and the Cp group are both bound to the metal M. The aforementioned compounds are classed as metallocene compounds (metallocenes). The Cp group may be singly or multiply substituted and may be for example an indenyl group or a fluorenyl group.

In the case of indenyl compounds known per se the R' substituent is bound to the indenyl group at the 1-position of the indenyl ring, the known indenyl compounds hence being 1-indenyl compounds. In the present invention the R' substituent must be bound to the Ind-group at the 2-position.

The substitution positions of the indenyl ring are generally and in this description numbered according to the IUPAC 1979 Nomenclature for Organic Chemistry, rule A 21.1. The numbering of the substituent positions is shown for indene below. This numbering is the same for an indenyl ring:

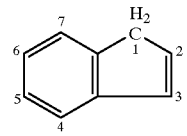

The 2-indenyl metallocene to be used is preferably a zirconium-2-indenyl metallocene. In particular, the R' group in formula (1) is a $C_1$–$C_{10}$ alkyl group or a trialkylsilyl group, Q being an alkyl group, or an alkoxy group or an amido group all preferably having 1–20 C-atoms, or a halogen atom.

According to the process of the invention, elastomeric polymers with a special combination of favourable properties can be prepared from ethylene, an α-olefine and optionally a diene. The invention hence also relates to an elastomeric polymer based on ethylene, an α-olefine and optionally a diene, characterised in that the polymer has a molecular weight distribution (MWD) of more than 3.5 and a Differential Long Chain Branching Index (DLCBI) of less than 0.25. In general such a polymer has a Mooney $M_L$ (1+4) at 125° C. of 5 or more. More preferred the polymer has a Mooney ML (1+4) at 125° C. of at least 10.

The Differential Long Chain Branching Index (DLCBI) or Branching Index is an indication of the degree of branching of the polymers according to the method indicated below.

With the aid of Size Exclusion Chromatography combined with Differential Viscometry (SEC-DV), absolute molecular weight distributions (MWDs) are determined for the elastomeric polymers according to the universal calibration principle described by Z. Grubistic, R. Rempp, H. Benoit, in J. Polym. Sci., Part B, 5, 753 (1967). It is a rule that Log ([η]*M) vs retention volume=constant, [η] being the intrinsic viscosity and M the absolute molecular weight.

The experimental Mark-Houwink relation yields information on long chain branching if it is compared with a linear Mark-Houwink relation, which is used as a reference. 'Long chain branching' is understood to be a branching in the polymer chain that is longer than a branching that results from the incorporation of a propylene or diene molecule. The reference Mark-Houwink relation is dependent on the average ethylene/α-olefin composition of the polymer. According to Th. G. Scholte, N. L. J. Meijerink, H. M. Schoffeleers, A. M. G. Brands, (in J. of Appl. Pol. Sci., Vol. 29, 3763–3782 (1984)), the following holds for the Mark-Houwink relation of a linear ethylene/propylene (EP) copolymer:

$$[\eta]_L = (1 - \tfrac{1}{3} * W_3)^{(1+a)} \cdot K_{PE} \cdot M^a \tag{2}$$

where:

$[\eta]_L$=viscosity of the linear copolymer (in dl/g)

$W_3$=the propylene weight fraction $K_{PE}$=the Mark-Houwink constant for linear polyethylene (PE) (=$4.06 \cdot 10^{-4}$)

a=the Mark-Houwink constant for linear polyolefinic copolymers (=0.725)

$W_3$ for such a polymer is calculated according to:

$$W_3 = C_3/(C_3 + C_2) \tag{3}$$

where $C_2$ and $C_3$ stand for the polymer's ethylene and propylene contents (in mass percentages), respectively.

The long chain branching of a polymer can be quantified with the aid of the branching parameter, $g'_I$, defined as:

$$g'_I = [\eta]_v/[\eta]_l \tag{4}$$

($[\eta]_v$ being the viscosity of the branched polymer) See L. I. Kulin, N. L. Meijerink, P. Starck, (in Pure & Appl. Chem., Vol. 60, No. 9, 1403–1415 (1988)) and S. Shiga, (in Polym. Plast. Technol. Eng., 28(1), 17–41 (1989)).

With SEC-DV $g'_I$ is determined as a function of the molar mass according to $$g'_{I(logM)} = ([\eta]_i/[\eta]_l)_{logM} \tag{5}$$

where:

$([\eta]_i)_M$=measured intrinsic viscosity of elution fraction with the molar mass M $g'_{I(logM)}$ plotted as a function of log M shows a continuous function, for which a decrease in $g'_{I(logM)}$ as a function of log M is observed if the polymer has long chain branching. This decrease represents the increase in the degree of long chain branching with an increasing molecular mass. This decrease is described by the differentiated curve, d(g'I)/d(logM). The value of this function in the high molecular weight range (at log M=6) describes the presence or absence of long chain branching. The value of d(g'I)/d(logM) at log M=6 is approximated by the Differential Long Chain Branching Index (DLCBI) defined as:

$$DLCBI = \frac{g'_{I(\log M = 5.8)} - g'_{I(\log M = 6.2)}}{0.4} \tag{6}$$

For the determination of a reliable DLCBI both the differential refractometer detector and the differential viscosimeter detector must have a minimum signal-to-noise ratio of 20 at log M=6.

The polymers according to the invention have a DLCBI of less than 0.25. If the polymer has a DLCBI of more than 0.25 the polymer is branched to such an extent that the compression set and processability are poorer.

The elastomeric polymers according to the invention preferably have a Mooney $M_L(1+4)$ at 125° C. of at least 10. The Mooney $M_L(1+4)$ at 125° C. is measured according to ISO 289 and is a measure of the polymer's plasticity. If the Mooney value is much smaller than 10, no good compression set is obtained. The Mooney of the polymers according to the invention is preferably at least 30, in particular at least 50.

In addition, the polymers according to the invention have an absolute molecular weight distribution (MWD) of more than 3.5. The molecular weight distribution is determined according to the method indicated above. If the MWD is smaller than 3.5 the polymer has insufficient processability. In particular, the MWD of an elastomeric polymer according to the invention is more than 4, in particular the MWD is between 4 and 30.

The polymers according to the invention hence have good mechanical properties, also at a low temperature, and a good processability.

The polymer according to the invention is an elastomeric polymer. An 'elastomeric polymer' according to the invention is understood to be a polymer for which no peak is observed at a temperature above 25° C. in a DSC analysis. The DSC analysis is an analysis with differential scanning calorimetry (DSC) as indicated in the experimental section. The presence of a DSC peak at a temperature above 25° C. leads to deterioration of the elasticity at lower temperatures. In particular, an elastomeric polymer according to the invention has no DSC peak at a temperature above 0° C.

The invention relates to a bimodal elastomeric polymer. If a polymer shows at least two separate molecular weight peaks in the SEC chromatogram it is a bimodal polymer. 'Bimodal polymers' are hence, without further specification, also understood to be tri- or multimodal polymers. In particular the invention relates to a bimodal polymer that comprises at least two molecular weight fractions, the fraction with a low molecular weight having a higher α-olefin and/or diene content than the fraction with the high molecular weight. The molecular weights and the molecular weight distributions are determined with the aid of SEC according to the method described above.

A terpolymer that comprises at least two molecular weight fractions, of which the fraction with the low molecular weight has a higher diene content than the fraction with the high molecular weight, is known from EP-A-227,206. A drawback of the terpolymers described in this patent publication is that they show long chain branching (the DLCBI being >0.25), as a result of which they do not show the combination of favourable properties of the polymers according to the invention. Furthermore, the terpolymers according to EP-A-227,206 are prepared through polymerisation in two separate reactors. According to the invention only one reactor and only one catalyst are required, although it is possible to use more reactors and catalysts.

The preparation of bimodal ethylene (co)polymers is known from EP-A-447,070. Here a combination of a metallocene catalyst and a transition-metal halogenide such as titanium tetrachloride is used as a catalyst. The ethylene (co)polymers prepared according to this method are not elastomeric.

It is furthermore known, for example from DE-A-3,825, 814, page 2, lines 26–29, that the homogeneity of the polymer that is prepared using two catalyst systems is poorer than that obtained using one catalyst system as according to the invention.

J. M. Vela Estrada and A. E. Hamielic (in Polymer 35(4), 1994, page 808) describe the polymerisation of ethylene in the presence of a catalyst with bis-cyclopentadienyl zirconium dichloride. A bimodal polyethylene is obtained through polymerisation under the influence of one catalyst in one reactor. To obtain a bimodal product the presence of aluminoxane is required as a cocatalyst. According to this article, however, polyethylene only is prepared and no elastomeric ethylene co- or terpolymer. The catalyst is not suitable for the preparation of bimodal polymers of ethylene, an $\alpha$-olefine and optionally a diene according to the invention.

DE-A-3,825,814 describes the preparation of a bimodal isotactic polypropylene in the presence of a catalyst with a bridged hafnium metallocene. DE-A-3,825,814 does however not describe the preparation of bimodal, elastomeric polymers of ethylene, an $\alpha$-olefine and optionally a diene according to the invention. DE-A-3,640,924 describes the preparation of a bimodal stereo block copolymer with alternating isotactically oppositely configured chain sequences. A bimodal polymer of ethylene, an $\alpha$-olefine and optionally a diene according to the invention is not described here either.

The invention will be further explained below. As indicated above, the catalyst used according to the invention comprises a 2-indenyl compound. The 2-indenyl compound is used as a catalyst in the manner known for metallocene catalysts, only the polymerisation conditions are chosen so that a bimodal polymer is obtained.

With the compounds according to the invention the Cp group of formula (1) may be for example a cyclopentadienyl group, a fluorenyl group or an indenyl group, all of which may or may not be substituted.

Besides the presence of the R' group at the 2-position in the indenyl compound, the indenyl group (the Ind group in formula (1)) may optionally be substituted at other positions, too. A substitution at the 1-position of the Ind group, which is connected to the Cp group via a bridge, is explicitly excluded. The Cp group may also be substituted. As the R' group use may be made of an alkyl, an aralkyl, an aryl or a group with at least one hetero atom from groups 14, 15 or 16 of the Periodic System of the Elements. Hydrogenated forms of indenyl compounds are also included in the scope of the invention. To achieve the effects of the invention, the R'-group may not form a bridge with the Cp-group.

It is known that metallocene compounds are generally used in combination with a cocatalyst. Generally this is an organometal compound, preferably an aluminium compound (like aluminoxane). According to J. M. Vela Estrada and A. E. Hamielic (in Polymer 35(4), 1994, page 808) the presence of aluminoxane as a cocatalyst is essential for obtaining bimodal polyethylene.

Although aluminoxanes can be used as a cocatalyst according to the invention, it is surprising that bimodal polymers can also be obtained according to the invention using other cocatalysts than aluminoxanes. The formation of bimodal products is not dependent on the type of cocatalyst chosen. According to the invention, the 2-indenyl compound can for example be converted into a cationic compound. See for the conversion into cationic compounds for example WO-A-91,09,882, EP-A-277,004 or WO-A-91,02,012. For example a combination of triethyl aluminium and a boron compound can thus be used as cocatalyst. These cocatalysts present the advantage that smaller amounts of cocatalyst can be used.

Use can also be made of cocatalysts as described in EP-A-287,666, pp. 20–21. Organo-aluminium oxy compounds as known from EP-A-360,492 are also suitable for use as cocatalysts. See also U.S. Pat. No. 4,769,428 (column 5), where organoaluminium alkyls and linear and cyclic aluminoxanes are used as cocatalysts. The aluminoxanes can be prepared in the manner known from these patent publications; they are also commercially available. Methyl aluminoxanes produced by Witco, Ethyl and Akzo can be mentioned as examples of commercially available aluminoxanes.

According to the invention, the catalyst can be used both on a carrier and without a carrier. An advantage of a catalyst on a carrier is that a smaller amount of cocatalyst (like aluminoxane) relative to the active component can be used to obtain the same catalyst activity. Catalysts on carriers are used mainly in gas-phase and slurry processes. The carrier may then be any carrier known for metallocene catalysts, for example $SiO_2$ or $Al_2O_3$.

Polymerisation of ethylene, an $\alpha$-olefine and optionally a diene may take place in a known manner, in the gas phase or in a liquid reaction medium. Both solution and suspension polymerisation are suitable for the latter option.

Examples of $\alpha$-olefines that are suitable for use as monomer besides ethylene in the preparation of an EA(D)M polymer are: propylene, butylene-1, pentene-1, hexene-1, octene-1 or their branched isomers, such as 4-methylpentene-1, and also styrene, $\alpha$-methylstyrene. Mixtures of these alkenes may also be used. Preferably used are propylene and/or butylene-1.

When preparing a terpolymer the diene in the polymerisation according to the invention is a polyunsaturated compound; it contains at least two C=C bonds and may be aliphatic or alicyclic. Aliphatic polyunsaturated compounds generally contain between 3 and 20 carbon atoms; the double bonds may be conjugated or, preferably, non-conjugated. Examples are: 1,3-butadiene, isoprene, 2,3-dimethylbutadiene 1,3, 2-ethylbutadiene 1,3, piperylene, myrcene, allene, 1,2-butadiene, 1,4,9-decatrienes, 1,4-hexadiene, 1,5-hexadiene and 4-methylhexadiene 1,4.

Alicyclic polyunsaturated compounds, which may or may not contain a bridge group, may be mono- or polycyclic. Examples of such compounds are norbornadiene and its alkyl derivatives; the alkylidene norbornenes, in particular the 5-alkylidene norbornenes-2, the alkylidene group of which contains between 1 and 20, preferably between 1 and 8, carbon atoms; the alkenyl norbornenes, in particular the 5-alkenyl norbornenes-2, the alkenyl group of which contains between 2 and 20, preferably between 2 and 10, carbon atoms, for example vinyl norbornene, 5-(2'-methyl-2'-butenyl) norbornene-2 and 5-(3'-methyl-2'-butenyl) norbornene-2; dicyclopentadiene and the polyunsaturated compounds of bicyclo-(2,2,1)-heptane, bicyclo-(2,2,2) octane, bicyclo-(3,2,1)-octane and bicyclo-(3,2,2)-nonane, at least one of the rings of which is unsaturated. Furthermore use can be made of compounds such as 4,7,8,9-tetrahydroindene and isopropylidene tetrahydroindene. In particular use is made of dicyclopentadiene, 5-methylene norbornene-2, 5-ethylidene norbornene-2, vinylnorbornene-2 or 1,4-hexadiene. Mixtures of the compounds described above may also be used.

The diene may be present in the terpolymer in amounts of up to 30 wt. %, preferably however in amounts of up to 10–15 wt. %.

The molar ratio of the monomers used depends on the desired composition of the polymer. As the polymerisation rate of the monomers differs considerably it is not possible to give generally applicable molar ratio ranges. In the copolymerisation of ethylene and the $\alpha$-olefin, in particular propylene, however, a molar ratio between 1:1 and 1:10 will generally be chosen. If a diene is copolymerised, the molar ratio of that compound relative to ethylene will usually be between 0.0001:1 and 1:1.

The polymerisation reaction is usually effected at a temperature of between −40 and 200° C., preferably between 10 and 80° C. The pressure will usually be 0.1–5 MPa, but it is also possible to use higher or lower pressures. The process is preferably carried out in continuous mode, but it may also be carried out in semi-continuous mode or batchwise.

The residence time during the polymerization may vary from a few seconds to several hours. Usually the residence time will be chosen to be between several minutes and an hour.

The polymerisation can take place in a liquid that is inert relative to the catalyst, for example one or more saturated aliphatic hydrocarbons, such as butane, pentane, hexane, heptane, pentamethyl heptane or petroleum fractions; aromatic hydrocarbons, for example benzene or toluene, or halogenated aliphatic or aromatic hydrocarbons. It is possible to use a temperature and pressure such that one or more of the monomers used, in particular the α-olefine, for example propylene, is liquid and is present in such an amount that it serves as a dispersing agent. There is then no need for a further dispersing agent.

If an aliphatic hydrocarbon is used as a solvent the solvent may contain small amounts of an aromatic hydrocarbon, for example toluene. If for example methyl aluminoxane (MAO) is used as a cocatalyst, toluene may serve as a solvent to enable the dosage of the MAO to the polymerisation reactor in solution.

The process according to the invention can be carried out in a polymerisation reactor filled with gas and liquid or in a reactor entirely filled with liquid. The use of a heterogenised catalyst makes it possible to carry out the polymerisation process in suspension or in the gas phase.

The molecular weight can be set via techniques known to a person skilled in the art, for example via the polymerisation temperature. The molecular weight can furthermore be varied by using chain length regulators, such as diethyl zinc and preferably hydrogen. Very small amounts of hydrogen already affect the molecular weight sufficiently.

After the polymerisation the polymer can be further processed in various manners, in the case of liquid-phase processes for example by evaporating the solvent or through steam coagulation.

The bimodal polymers obtained according to the process of the invention generally contain between 15 and 85 wt. % ethylene. Products with ethylene contents of between 40 and 75 wt. % are preferred. Such polymers are suitable for many applications, for example for the manufacture of hoses, conveyor belts or sealing profiles. They can optionally be vulcanised according to the usual methods (for example with the aid of substances yielding free radicals, such as peroxides, or with the aid of sulphur).

To make the product processable as a rubber, the polymer can be mixed with oil, preferably immediately after the polymerisation. The addition of agents to obtain a so-called friable bale is known. Ways in which this can be effected involve the addition of for example talcum or the use of a system as described in EP-A-427,339. The composition described in that patent publication, comprising an inorganic partitioning agent, a thickening agent and an anionic dispersing agent, has been found very suitable for use for the products according to the invention.

The invention will be explained with reference to the following examples and comparative experiments. The 2-indenyl metallocenes that were synthesized were analysed with the aid of neutron activation analysis and H-NMR (hydrogen nuclear magnetic resonance). Neutron activation analysis was used to determine, among other factors, the transition metal and halogen contents. H-NMR yielded information on the structure of the 2-indenyl compounds. The H-NMR analyses were carried out using a Bruker AC200 NMR apparatus at a frequency of 200 MHz. The samples for the NMR analysis were prepared by adding about 1 ml of deuterobenzene to 1–10 mg of the 2-indenyl compound.

The crystallisation behaviour of the polymers obtained was determined with the aid of differential scanning calorimetry (DSC). After rapid heating of the preparation to 200° C. and 5 minutes heating at this temperature, the sample was cooled at a rate of 10° C./minute to −70° C. The heat effects occurring in this process were recorded.

The composition of the polymers was determined with the aid of Fourier Transform Infrared Spectroscopy (FT-IR), by the method usually applied in the rubber industry. The FT-IR results indicate the composition of the various monomers in weight percentages relative to the overall composition.

After the usual purification for monomers and solvents, the ingredients used for the polymerisation were extra thoroughly dried before being introduced into the polymerisation reactor by passing them through a column containing Cu-deoxo catalyst and a column containing a molecular sieve of type 4A or 13X. As a result, the water content of the polymerisation medium was always (unless indicated differently) less than 0.5 ppm.

EXAMPLES

The catalyst bis(2-methylindenyl) zirconium dichloride was prepared from commercially available starting products in the manner described below:

1. Synthesis of 2-Methylindene 50 ml of diethyl ether was added to 2.5 g of magnesium. A solution of 14.3 g of methyliodide in 50 ml of diethyl ether was added in 1 hour, with cooling with the aid of a water bath. Then the reaction mixture was stirred for 30 minutes at room temperature. A solution of 13.2 g of 2-indanone in 40 ml of diethyl ether was then added to this reaction mixture, followed by 30 minutes' stirring. 100 ml of water was then added. The organic layer was separated from the water layer. This water layer was washed twice, using 50 ml of dichloromethane, after which the combined organic layers were dried over magnesium sulphate. The filtrate obtained after removal of the drying agent through filtration was concentrated through evaporation to yield 14.0 g of residue. This residue was dissolved in 100 ml of toluene, after which 4 drops of concentrated sulphuric acid were added and the resulting reaction mixture was refluxed for 30 minutes. After cooling to room temperature, the mixture was washed once using 50 ml of water. The toluene was removed through evaporation, after which the residue was distilled under a vacuum. Yield: 4.0 g of 2-methylindene (30%).

2. Synthesis of Bis(2-Methylindenyl) Zirconium Dichloride

The synthesis of the catalyst was carried out in a nitrogen atmosphere for the strict prevention of the introduction of traces of oxygen and water.

17.9 ml of normal butyllithium (n-BuLi) (a 1.6 M solution in hexane) was added to a solution of 3.72 g of 2-methylindene in 40 ml of diethyl ether at −56° C. After removal of the cooling medium the reaction mixture was stirred for 2 hours (room temperature was reached after 30 minutes). Then the reaction mixture was cooled to −56° C. and combined with a suspension of 3.33 g of zirconium tetrachloride in 40 ml of diethyl ether (also cooled to −56° C.). The cooling medium was removed and the reaction mixture was stirred for two hours (reaction took place within a few seconds). Then the solid substance (bis(2-methylindenyl) zirconium dichloride with complexed lithium chloride) was removed through filtration. The residue obtained was washed once using 25 ml of diethyl ether and twice using 50 ml of special boiling point spirit (a mixture of aliphatic hydrocarbons with a boiling range from 65 to 70° C.), after which it was dried for several hours under a vacuum. Yield: 5.27 g of a yellow solid substance, bis(2-methylindenyl) zirconium dichloride.

3. Polymerisation of Ethylene, Propylene and Optionally 5-Ethylidene Norbornene-2

The above obtained bis-(2-methylindenyl) zirconium dichloride was used for the solution polymerisation of ethylene, propylene and where indicated 5-ethylidene norbornene-2 (ENB). The examples were carried out batchwise or in continuous mode according to the polymerisation instructions described below.

3.1. Batch-Polymerisation 400 ml of hexane and a cocatalyst were introduced into a 1.5-liter reactor. The reactor was conditioned by passing a propylene-ethylene mixture over it. The propylene:ethylene ratio was 2. The reactor pressure is 0.8 MPa.

When the temperature and the off-gas of the reactor were constant, the catalyst and 100 ml of hexane were pumped into the reactor, which caused the polymerisation reaction to start. During the polymerisation the reactor's gas cap was refreshed with a stream of propylene-ethylene (200 nl and 100 nl, respectively).

After some time the pressure in the reactor was relieved and the clear solution was drained from the reactor. The polymer was isolated from the solution through evaporation. Analyses were carried out.

3.2 Continuous Polymerisation

A number of continuous streams of petrol, propylene, ethylene and optionally diene, catalyst and cocatalyst were dosed to a 1.5-liter reactor. All the raw materials were extensively purified as described above. The solution was continuously removed from the reactor. The catalyst was inactivated with the aid of isopropyl alcohol in a flash vessel, the monomers were flashed and the solution was stabilised with the aid of about 30 ppm of Irganox 1076. The polymer was analysed after further processing.

4. Analysis of the (Ter)Polymers

The (ter)polymers prepared according to the examples were analysed by means of Size Exclusion Chromatography and Differential Viscosimetry (SEC-DV) according to the method described above. All the (ter)polymers described in the examples were elastomeric and showed no peak temperatures above 25° C. in a DSC analysis; most polymers showed no peaks at temperatures above 0° C.

5. GPC Apparatus and Experimental Conditions

Apparatus

A Waters M150c Gel Permeation Chromatograph (GPC) with a DRI detector for the size exclusion chromatography;

A Viscotel differential viscometer (DV), model 100-02;

Detectors in parallel configuration with heated line interface (HLI);

An Erma ERC-3522 solvent degasser;

A LiChroma III pump pulse dampener (Viscotek) and high sensitivity accessory (Waters).

Data Processing

Vicotek data-processing software, UNICAL 4.04 or a higher version.

Columns

Toyo Soda (TSK) GMHXL-HT mixed bed (4×).

Calibration

Universal calibration with a linear polyethylene PE standard (molecular weight 0.4–4000 kg/mol)

Temperatures

Column oven 140° C.;

Injector compartment 150° C.;

Pump solvent compartment 60° C.;

DV oven 150° C.

SEC Conditions

Flow: 1.0 ml/min;

Injection volume: 0.300 ml.

Solvent/Eluent

Distilled 1,2,4-Trichlorobenzene, containing approximately 1 g/l Ionol stabiliser.

Sample Preparation

Dissolution for 4 hours at approx. 150° C.;

Filtration through a 1.2-micron Ag filter;

Sample concentration approx. 1.0 mg/ml.

6. Examples I–VII and Comparative Experiments A and B

In Examples I–VII a terpolymer was prepared according to the continuous process described above. Comparative Experiments A, B and C describe the analysis of Keltan® terpolymers prepared with the aid of a conventional vanadium catalyst: type K4802 in Comparative Experiment A, type K4903 in Comparative Experiment B and type K312 in Comparative Experiment C (all from DSM).

Table 1 presents the polymerisation conditions of the continuous polymerisation of ethylene, propylene and 5-ethylidene norbornene-2 for Examples I–VII. This table indicates: the amounts of hexane, propylene, ethylene and 5-ethylidene norbornene-2, the amount of catalyst (bis-(2-methylindenyl) zirconium dichloride) added, the amount of cocatalyst (methyl aluminiumoxane type Akzo MMAO 3A), the polymerisation temperature and the polymerisation time.

The amounts of ethylene, propylene and 5-ethylidene norbornene are expressed in normal liters/hour (nl/h), one 'normal liter' being understood to be one liter at a pressure of 0.1 MPa and a temperature of 273.15 K.

The results of the continuous polymerisation according to Examples I–VII and Comparative Experiments A–C are indicated in Table 2. This table indicates: the polymer production (yield), expressed in grams/hour, the composition of the polymer determined with the aid of Fourier-Transform Infrared Analysis, expressed in weight percentages, the number average molecular weight ($M_n$), the weight average molecular weight ($M_w$) and the absolute molecular weight distribution (MWD) determined with the aid of SEC, the Mooney value of the polymer and the differential long chain branching index (DLCBI). The Mooney ($M_L$ (1+4)) of the polymer was determined according to ISO 289, at a temperature of 125° C. The Mooney value of the polymer of Example V was so high that it could not be determined at 125° C. The Mooney $M_L$ (1+4) at 150° C. was 122.

TABLE 1

Polymerisation conditions of Examples I–VII

| Example | hexane (kg/h) | propylene (nl/h) | ethylene (nl/h) | ENB (ml/h) | Zr cat. mmol/h | MAO mmol/h | Temp. (°C.) | time (min) |
|---|---|---|---|---|---|---|---|---|
| I | 2.5 | 232 | 95 | 34 | 0.02 | 10 | 40 | 14 |
| II | 2.3 | 255 | 99 | 75 | 0.015 | 15 | 40 | 15 |
| III | 2.5 | 232 | 95 | 34 | 0.018 | 9 | 40 | 14 |
| IV | 2.5 | 237 | 97 | 34 | 0.058 | 27 | 47 | 13 |
| V | 3.9 | 434 | 162 | 128 | 0.046 | 25 | 40 | 9 |
| VI | 2.3 | 260 | 98 | 77 | 0.023 | 24 | 40 | 15 |
| VII | 1.1 | 100 | 37 | 29 | 0.008 | 8 | 41 | 30 |

TABLE 2

Results of the polymerisation and analysis of the polymers according to Examples I–VII and Comparative Experiments A, B and C.

| Example/ Comp. Experiment | Yield (g/hour) | % C3 (wt. %) | % ENB (wt. %) | Mn *1000 (kg/kmol) | Mw *1000 (kg/kmol) | MWD (-) | Mooney 125° C. (-) | DLCBI (-) |
|---|---|---|---|---|---|---|---|---|
| I | 134 | 47.8 | 4.5 | 70 | 340 | 4.8 | 95 | 0.01 |
| II | 150 | 46.4 | 9.1 | 71 | 330 | 4.6 | 100 | 0.06 |
| III | 133 | 46.9 | 4.8 | 67 | 330 | 4.0 | 86 | 0.17 |
| IV | 168 | —* | —* | 20 | 165 | 8.2 | 20 | 0.03 |
| V | 235 | 44.9 | 9.2 | 94 | 360 | 3.8 | — | 0.18 |
| VI | 156 | 47.5 | 9.1 | 80 | 330 | 4.1 | 90 | 0.05 |
| VII | 68 | 52.9 | 8.9 | 45 | 230 | 5.1 | 38 | 0.00 |
| A | — | 47.1 | 4.3 | 85 | 240 | 2.8 | 77 | 0.43 |
| B | — | 45.6 | 9.0 | 90 | 320 | 3.5 | 90 | 0.40 |
| C | — | 48.1 | 4.3 | 46 | 215 | 4.7 | 33 | 0.44 |

*could not be determined due to deviating base line
**measured at 150° C.

The SEC chromatograms of Examples I and II are shown in FIG. 1, those of Examples III and IV in FIG. 2 and those of Examples V–VII in FIG. 3. The chromatograms show the bimodality of the terpolymers according to the invention.

All the polymers according to Examples I–VII have low chain branching indices, below 0.25. From Examples I and II it is apparent that the bimodality decreases with increasing diene content. From Examples III and IV it is apparent that a higher polymerisation temperature results in a greater MWD and a lower Mooney value. Examples V, VI and VII show that a longer residence time results in a greater MWD and a lower Mooney value. Products A, B and C all show a high DLCBI; they are all mono-modal.

4. Fractionation of the Polymer Obtained in Example I

A sample of the polymer obtained in Example I was fractionated in order to determine its composition. Fractionation, which results in a separation into molecular weight fractions, was effected according to the solvent/non-solvent principle; see Holtrup (in 'Macromolekularchemie' 178, p. 2335 (1977)). The composition of the fractions was determined with the aid of FT-IR; the molecular weights of fractions 3 and 7 were determined with the aid of SEC-DV. The molecular weights of the fractions increased from fraction 1 to fraction 9. The results of the fractionation are indicated in Table 3. Fractionation shows that the fractions with low molecular weights of the bimodal polymers according to the invention have higher propylene and diene contents than the fractions with high molecular weights.

TABLE 3

Fractionation of the polymer of Example I

| Fraction No. | Weight (g) | % C3 (wt. %) | % ENB (wt. %) | Mw *1000 (kg/kmol) |
|---|---|---|---|---|
| 1 | 0.400 | — | — | — |
| 2 | 0.233 | — | — | — |
| 3 | 0.272 | 50.5 | 5.4 | 90 |
| 4 | 0.468 | 47.2 | 5.3 | — |
| 5 | 0.763 | 43.8 | 4.9 | — |
| 6 | 0.512 | 41.7 | 4.5 | — |
| 7 | 0.469 | 40.8 | 4.2 | 502 |
| 8 | 0.542 | 41.1 | 4.0 | — |
| 9 | 0.054 | — | — | — |

5. Preparation of Compounds Based on the Terpolymers of Example I and Comparative Experiment A A standard compound was prepared from the terpolymers of Example I (compound I) and Comparative Experiment A (compound A) according to a 70-40-70 recipe as described in 'Kautschuk und Gummi Kunsstoffe', Vol. 41 (1988), pp. 558–563. The processing and compound properties were determined; they are indicated in Table 4. The extrusion behaviour of the compounds in Table 4 was good.

TABLE 4

Determination of processing and compound properties

| Property | Compound I | Compound A |
|---|---|---|
| Maximum energy peak after time (s) | 126 | 144 |
| Vulcanisation properties: ISO 815 compression set | | |
| 24 hours/70° C. | 11 | 12 |
| 72 hours/23° C. | 6 | 7 |
| Iso 37 tensile strength (MPa) | 14.5 | 13.3 |
| Iso 37 elongation at break (%) | 530 | 495 |
| Delft tear strength (N) | 37 | 38 |

The compound of terpolymer I according to the invention showed a very short mixing time (energy peak after 126 s), a good extrusion behaviour and very good compound properties.

Examples VIII–X and Comparative Experiments D, E and F

In Examples VIII–X and Comparative Experiments D, E and F the polymerisations were carried out batchwise. Example VIII describes a batch-copolymerisation of ethylene and propylene using the catalyst according to Example I, the Al/Zr ratio (the molar ratio between aluminium and zirconium) being 2500. The amount of Zr was 2 μmol. In Example IX a cocatalyst consisting of triethyl aluminium and a boron fluoride (B(C$_6$F$_5$)$_4$$^-$; (Zr/B/Al molar ratio=1/2/50) was used instead of a MAO cocatalyst. The amount of Zr was 10 μmol. The analysis of the prepared copolymer shows a bimodal product, obtained without using an aluminoxane compound (MAO).

The catalyst used in Example X was: bis(trimethylsilyl-2-indenyl) zirconium dichloride, with MAO as a cocatalyst (Al/Zr ratio=2500, Zr=2 μmol); the process conditions were as in Example I. A bimodal copolymer with high molecular weight was also obtained with this 2-indenyl metallocene.

Comparative Experiment D was carried out as Example VIII, only the bis-(2-methylindenyl) hafnium dichloride was used as a hafnium metallocene catalyst instead of bis(2-methylindenyl) zirconium dichloride. The Al/Hf molar ratio was 1000. The amount of hafnium metallocene was 4 μmol. A non-bimodal polymer with an MWD of 2.3 was obtained. No bimodal polymers were obtained in other experiments with hafnium-2-indenyl metallocenes either.

Comparative Experiment E was carried out as Example I, only bis-(2-thiobutylindenyl) zirconium dichloride was used as a catalyst instead of (bis-(2-methylindenyl) zirconium dichloride). The Al/Zr molar ratio was 2500. The amount of Zr was 2 μmol. A non-bimodal polymer with an MWD of 1.8 was obtained. This experiment shows that the type of substituent chosen at the indenyl ring of the 2-indenyl metallocene is important for obtaining bimodality.

Comparative Experiment F is an experiment that was carried out as Example VIII, 0.5 ppm water was added to the polymerisation medium. The polymerisation took place as in Example VIII, with the same yield, only no bimodal product was obtained in the presence of the water. The MWD was only 2.2.

The analysis of the products is shown in Table 4. The Hoekstra value indicated in the table is a measure of the polymer's plasticity. To determine the Hoekstra value a rubber plate is placed between two platens at a temperature of 106° C. The platens are set 1 mm apart. After 30 seconds a load of 1 MPa is applied and after 15 seconds the distance between the platens is measured. The figure 100 minus the decrease in thickness expressed in percentages is the Hoekstra value.

TABLE 4

Analysis of polymers prepared according to Examples VIII-X and Comparative Experiments D, E and F.

| Example/ Comp. Experiment | Temp. (°C.) | Yield (g) | Hoekstra (%) | % C3 (wt. %) | Mn *1000 (kg/kmol) | Mw *1000 (kg/kmol) | MWD (-) |
|---|---|---|---|---|---|---|---|
| VIII | 30 | 10 | 85 | 49 | 125 | 460 | 3.7 |
| XX | 50 | 22 | 9 | 46 | 6.6 | 72 | 11 |
| X | 30 | 8 | 12 | 50 | 6.1 | 150 | 25 |
| D | 30 | 8 | 64 | 68 | 170 | 385 | 2.3 |
| E | 30 | 4 | 79 | 32 | 95 | 170 | 1.8 |
| F | 32 | 10 | 90 | 49 | 230 | 505 | 2.2 |

We claim:

1. A process for the preparation of a bimodal elastomeric polymer having at least two separate molecular weight peaks in a SEC-DV chromatogram and having no peak observed at a temperature above 25° C. in a DSC-analysis, said bimodal polymer having a molecular weight distribution (MWD) of more than 3.5, as determined by SEC-DV, said process comprising:

polymerizing ethylene, an a-olefin and optionally a diene, in a polymerization medium in the presence of a metallocene catalyst under effective polymerization conditions, wherein the amount of water in the polymerization medium is less than 0.5 ppm, wherein said polymer is obtained, and wherein said metallocene catalyst is a 2-indenyl metallocene having the general formula:

$$R'Ind\text{—}M\text{—}(CP)\text{—}Q_k \qquad (1)$$

wherein:

M represents a metal chosen from the group consisting of zirconium and titanium, Cp represents a cyclopentadienyl group, an indenyl group or a fluorenyl group, Ind represents a 2-substituted indenyl group with an R' substituent at the 2-position of the indenyl group, optionally substituted with R' at other positions, which indenyl group is not connected to the Cp group via a bridge, R' represents an alkyl, aralkyl, aryl group or a group with at least one hetero atom from groups 14 or 15 of the Periodic System of the Elements, Q represents a ligand to M wherein Q represents an alkyl group, an alkoxy group, an amido group or a halogen atom, and k represents a value equal to the valency of the M-group minus 2, divided by the valency of the Q group.

2. A process for the preparation of a polymer which comprises the step of:

polymerizing ethylene, an a-olefin and optionally a diene in a polymerization medium in the presence of a metallocene catalyst under effective polymerization conditions, wherein the amount of water in the polymerization medium is less than 0.5 ppm, wherein the metallocene catalyst is a 2-indenyl metallocene having the general formula:

$$R'Ind\text{—}M\text{—}(Cp)\text{—}Q_k \qquad (1)$$

wherein:

M represents a metal selected from the group consisting of zirconium and titanium, Cp represents a cyclopentadiene group, an indenyl group or a fluorenyl group, Ind represents a 2-substituted indenyl group with an R' substituent at the 2-position of the indenyl group, optionally substituted with R' at other positions, which indenyl group is not connected to the Cp group via a bridge, R' represents a $C_1$–$C_{10}$ alkyl group or trialkyl silyl group, Q represents a ligand to M wherein Q represents an alkyl group, an alkoxy group, an amido group or a halogen atom, and k represents a value equal to the valency of the M-group minus 2, divided by the valency of the Q group, wherein a bimodal elastomeric polymer having at least two separate molecular weight peaks in a SEC-DV chromatogram and having no peak observed at a temperature above 25° C. in a DSC-analysis, with a molecular weight distribution (MWD) of more than 3.5, as determined by SEC-DV, is obtained.

3. A process according to claim 1 or 2, wherein Q contains 1–20 carbon atoms.

4. A process according to claim 1 or 2, wherein $R^1$ represents an alkyl group.

5. A process according to claim 1 or 2, wherein R' represents a trialkyl silyl group.

6. A process according to claim 1 or 2, wherein Q represents a chlorine atom.

7. A process according to claim 1, wherein the metallocene catalyst is bis-(2-methylindenyl) zirconium dichloride.

8. A process according to claim 1, wherein said metallocene catalyst is bis-(trimethylsilyl-2-indenyl) zirconium dichloride.

9. A process according to claim 1 or 2, wherein the M represents zirconium.

10. A process according to claim 1, wherein the polymerization is carried out in one reactor.

11. A process according to claim 2, wherein Cp is a cyclopentadiene group.

12. A process according to claim 1 or 2, wherein the polymerization is conducted at a temperature of −40° to 200° C.

13. A process according to claim 12, wherein the temperature is between 10° C. and 80° C.

14. A process according to claim 1 or 2, wherein said α-olefin is branched or unbranched and is selected from the group consisting of propylene, 1-butylene, 1-pentene, 1-hexene, 1-octene, and styrene.

15. A process according to claim 1 or 2, wherein said polymerization is conducted in the presence of a diene, and wherein said diene is a co-polymerizable monomer which is an aliphatic or alicyclic unsaturated compound having at least two C=C bonds.

16. A process according to claim 15, wherein said diene is a copolymerizable aliphatic unsaturated compound having at least two C=C bonds and between 3 and 20 carbon atoms.

17. A process according to claim 16, wherein said diene is selected from the group consisting of 1,3-butadiene, isoprene, 2,3-dimethyl-1,3-butadiene, 2-ethyl-1,3-butadiene, piperylene, myacene, allene, 1,2-butadiene, 1,4,9-decatriene, 1,4-hexadiene, 1,5-hexadiene and 4-methyl-1,4-hexadiene.

18. A process according to claim 2, wherein Cp is an indenyl group with a substitutent.

19. A process according to claim 14, wherein said polymerization is conducted in the presence of a diene, and wherein said diene is a co-polymerizable monomer which is an aliphatic or alicyclic unsaturated compound having at least two C=C bonds.

* * * * *